H. L. McAvoy,

Rotary Blower.

No. 2,069. Reissued Sept. 5, 1865.

Witnesses:
C. D. Smith
G. Schnellin

Inventor:
H. L. McAvoy
by Munn & Co
Attorneys

UNITED STATES PATENT OFFICE.

HUGH L. McAVOY AND ELIAS P. HUTCHINSON, OF BALTIMORE, MARYLAND, ASSIGNEES OF HUGH L. McAVOY.

IMPROVED APPARATUS FOR CARBURETING AIR.

Specification forming part of Letters Patent No. 45,456, dated December 13, 1864; Reissue No. 2,069, dated September 5, 1865.

*To all whom it may concern:*

Be it known that I, HUGH L. McAVOY, of the city and county of Baltimore, in the State of Maryland, have invented a new and Improved Mode of Carbureting Air; and I do hereby declare the following to be a full and clear and exact description of the same, reference being had to the accompanying drawings, making part of this specification, in which—

Figure 1:
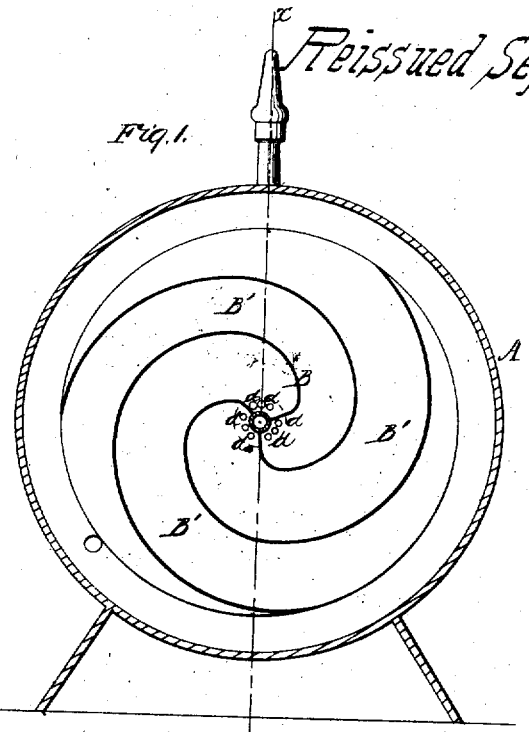
Figure 2:
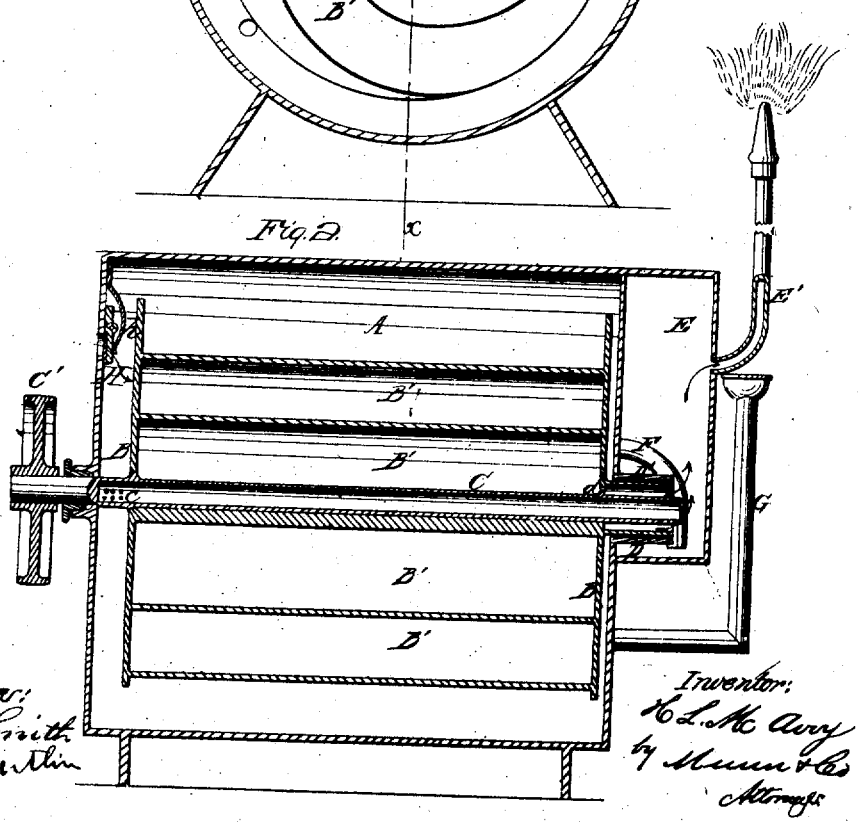

Figure 1 is a transverse section of an apparatus embodying my invention, and Fig. 2 is a longitudinal section of the same in the line *x x*.

Similar letters of reference indicate corresponding parts in the two figures.

The object of this invention is to obtain a more effectual method of mixing together air and hydrocarbon liquid for the purpose of producing inflammable gas to be used for illuminating or heating; and to this end the invention consists in forcing air and oil through a rotating wheel or an apparatus partly submerged in hydrocarbon fluid, and having winding passages in which the oil and air are kept in a constant state of agitation and mutual compressure until discharged through a suitable outlet into a receiver, from which the gas which has been compounded of the oil and air may be conducted off to be burned, while the oil which has not been mixed with the air is returned to the vessel or reservoir, all as will be hereinafter fully described.

The following description will enable others skilled in the art to which my invention appertains to fully understand and use the same.

In the accompanying drawings, A represents a cylindrical vessel or reservoir, in which is mounted a wheel, B, having a series of winding passages, B′ B′ B′, each of which terminates at the center of the wheel and communicates with the interior of the vessel A, as clearly represented in Fig. 1. A central hollow shaft, C, carrying a pulley, C′, may be connected with any suitable mechanism—such as that of a clock—for producing the rotation of the wheel B. One of the journals upon which said wheel rotates is constituted by the shaft C, and its other journal consists of a hollow neck or tube, D, which has a sleeve-like bearing, D′, the latter being somewhat larger than the tube D, in order that a space may exist between the journal and its bearing, for the purpose to be explained. The tube or journal D communicates at the center of the wheel B with the spaces B′ through perforations *d*. The tube D and hollow shaft C lead into the gas receiver or chamber E, from which the gas is conducted off for use through a pipe, E′.

F is a pipe communicating at its respective ends with the vessel A and chamber E, employed, in addition to other provisions, to return the oil from the chamber to the vessel.

H is a valve adapted to open automatically when the apparatus is in operation, to admit air to the interior of the vessel A, and to be closed by a spring, *h*, when the operation ceases, for the purpose of excluding air, and thus preventing the evaporation of the oil or hydrocarbonaceous fluid.

G is a pipe through which the vessel A may be supplied with the hydrocarbon fluid or oil. The hollow shaft C, near the end at which it forms a journal for the wheel B, communicates with the interior of the vessel A through perforations *c*.

Operation: The hydrocarbon fluid or oil on being introduced into the vessel A finds its level in the passages B′ of the wheel or apparatus B, and when the oil has risen to about the horizontal center of the wheel B the supply should be shut off, so as to permit the upper part of said wheel to be occupied by air, which enters the vessel A through the valve H in the manner described. As the wheel rotates and the entrances of the air-containing passages of the wheel B are presented downward, the oil which is taken in holds the air within the passages B′ and forces it to the center of the wheel B, together with the oil which the wheel first contained. The continuous pressure toward the center of the wheel forces the oil and water through the tube D and into the chamber E. In going through the passages B′ the air is held between and in contact with two columns or bodies of oil, and the motion of the wheel B agitates the oil and air in such a way that they become intimately mixed and become a gaseous compound before passing into the chamber E. Any oil which may enter the chamber E and the condensed vapor or gas therein flows back into the vessel A through the space between the tube D and its bearing D′, and should the oil become excessive in said chamber E, it flows with increased rapidity into the vessel A through the perforations *e* in the hollow shaft C and through the pipe F. The partial vacuum formed within the vessel A by the action of the wheel B permits the pressure from the external atmosphere to open the valve H, and the air then passes in to be carbureted in the manner described. As no water is used in this process of generating gas, the contents of the apparatus cannot freeze.

Having thus described my invention, the following is what I claim as new and desire to secure by Letters Patent:

1. Generating gas by forcing air through or mixing it with hydrocarbon fluid by means of a partially-submerged air-forcing apparatus arranged, substantially as described, to pass the air through the wheel.

2. Using an air-forcing apparatus within a chamber supplied with air through an automatic valve or by any other means adapted to prevent the evaporation of the fluid when the apparatus is not in operation.

3. The employment, in connection with the vessel A and air-forcing apparatus B, of a valve, H, adapted to automatically open when the apparatus is in operation for the purpose of supplying air to be carbureted, and to close when the operation is suspended in order to prevent the oil from evaporating, as explained.

HUGH L. McAVOY.

Witnesses:
W. H. HAYWARD,
PHIL. T. TILYARD.